US008165954B2

(12) United States Patent
Waelbroeck et al.

(10) Patent No.: US 8,165,954 B2
(45) Date of Patent: Apr. 24, 2012

(54) BLOCK TRADING SYSTEM AND METHOD PROVIDING PRICE IMPROVEMENT TO AGGRESSIVE ORDERS (75) Inventors: Henri Waelbroeck, Scarsdale, NY (US); Fred J. Federspiel, Larchmont, NY (US); Andrew Roper, Brooklyn, NY (US); Howard Engelhart, Hoboken, NJ (US); Sean Kirkpatrick, Chesterfield, NJ (US)

(73) Assignee: Pipeline Financial Group, Inc., New York, NY (US)

( * ) Notice: Subject to any disclaimer, the term of this patent is extended or adjusted under 35 U.S.C. 154(b) by 764 days.

(21) Appl. No.: 12/181,117

(22) Filed: Jul. 28, 2008

(65) Prior Publication Data

US 2009/0089199 A1 Apr. 2, 2009

Related U.S. Application Data (60) Provisional application No. 61/043,172, filed on Apr. 8, 2008, provisional application No. 61/032,623, filed on Feb. 29, 2008, provisional application No. 60/981,242, filed on Oct. 19, 2007, provisional application No. 60/962,307, filed on Jul. 26, 2007.

(51) Int. Cl.
*G06Q 40/00* (2006.01)
(52) U.S. Cl. ............................................ 705/37; 705/38
(58) Field of Classification Search ............... 705/37–40
See application file for complete search history.

(56) References Cited

U.S. PATENT DOCUMENTS

| 3,648,270 | A | 3/1972 | Metz et al. |
|---|---|---|---|
| 5,101,353 | A | 3/1992 | Lupien et al. |
| 5,136,501 | A | 8/1992 | Silverman et al. |
| 5,255,309 | A | 10/1993 | Katz |
| 5,689,652 | A | 11/1997 | Lupien et al. |
| 5,717,989 | A | 2/1998 | Tozzoli et al. |
| 5,724,524 | A | 3/1998 | Hunt et al. |
| 5,724,525 | A | 3/1998 | Beyers, II et al. |
| 5,794,207 | A | 8/1998 | Walker et al. |
| 5,802,499 | A | 9/1998 | Sampson et al. |
| 5,806,044 | A | 9/1998 | Powell |
| 5,812,988 | A | 9/1998 | Sandretto |
| 5,842,178 | A | 11/1998 | Giovannoli |
| 5,845,266 | A | 12/1998 | Lupien et al. |
| 5,873,071 | A | 2/1999 | Ferstenberg et al. |
| 5,905,975 | A | 5/1999 | Ausubel |

(Continued)

FOREIGN PATENT DOCUMENTS

AU 2005220858 A1 9/2005

(Continued)

OTHER PUBLICATIONS

J. D. Farmer and N. Zamani, "Mechanical vs. Informational Components of Price Impact," 2006; http://www.santafe.edu/research/publications/workingpapers/ 06-09-034.pdf; pp. 1-19.

(Continued)

*Primary Examiner* — Thu Thao Havan
(74) *Attorney, Agent, or Firm* — Cowan, Liebowitz & Latman; Steven D. Underwood (57) ABSTRACT In a trading system for trading securities or the like, traders are given various methods for providing protection from poor executions caused by adverse movements in the market and/or other traders seeking to "game" the system.

13 Claims, 4 Drawing Sheets

U.S. PATENT DOCUMENTS

| | | |
|---|---|---|
| 5,924,082 A | 7/1999 | Silverman et al. |
| 5,950,177 A | 9/1999 | Lupien et al. |
| 6,151,588 A | 11/2000 | Tozzoli et al. |
| 6,211,880 B1 | 4/2001 | Impink, Jr. |
| 6,236,979 B1 | 5/2001 | Kawabata et al. |
| 6,255,309 B1 | 7/2001 | Pees et al. |
| 6,260,025 B1 | 7/2001 | Silverman et al. |
| 6,282,521 B1 | 8/2001 | Howorka |
| 6,285,983 B1 | 9/2001 | Jenkins |
| 6,285,984 B1 | 9/2001 | Speicher |
| 6,304,858 B1 | 10/2001 | Mosler et al. |
| 6,317,727 B1 | 11/2001 | May |
| 6,317,728 B1 | 11/2001 | Kane |
| 6,321,205 B1 | 11/2001 | Eder |
| 6,321,212 B1 | 11/2001 | Lange |
| 6,343,278 B1 | 1/2002 | Jain et al. |
| 6,408,282 B1 | 6/2002 | Buist |
| 6,421,653 B1 | 7/2002 | May |
| 6,578,014 B1 | 6/2003 | Murcko, Jr. |
| 6,594,643 B1 | 7/2003 | Freeny, Jr. |
| 6,622,131 B1 | 9/2003 | Brown et al. |
| 6,766,304 B2 | 7/2004 | Kemp, II et al. |
| 6,772,132 B1 | 8/2004 | Kemp, II et al. |
| 6,912,510 B1 | 6/2005 | Shepherd |
| 6,938,011 B1 | 8/2005 | Kemp, II et al. |
| 6,985,883 B1 | 1/2006 | Togher et al. |
| 7,003,486 B1 | 2/2006 | Condamoor et al. |
| 7,035,819 B1 | 4/2006 | Gianakouros et al. |
| 7,099,839 B2 | 8/2006 | Madoff et al. |
| 7,110,974 B1 | 9/2006 | Rust |
| 7,130,823 B1 | 10/2006 | Rayner et al. |
| 7,136,834 B1 | 11/2006 | Merrin et al. |
| 7,152,042 B1 | 12/2006 | Arkes |
| 7,162,447 B1 | 1/2007 | Cushing |
| 7,162,448 B2 | 1/2007 | Madoff et al. |
| 7,165,045 B1 | 1/2007 | Kim-E |
| 7,308,428 B1 | 12/2007 | Federspiel et al. |
| 7,356,498 B2 | 4/2008 | Kaminsky et al. |
| 7,356,500 B1 | 4/2008 | Waelbroeck et al. |
| 7,401,044 B1 | 7/2008 | Fraser et al. |
| 7,428,506 B2 | 9/2008 | Waelbroeck et al. |
| 7,430,533 B1 | 9/2008 | Cushing |
| 7,565,313 B2 | 7/2009 | Waelbroeck et al. |
| 7,617,144 B2 | 11/2009 | Madoff et al. |
| 2001/0027437 A1 | 10/2001 | Turbeville et al. |
| 2002/0010672 A1 | 1/2002 | Waelbroeck et al. |
| 2002/0026404 A1 | 2/2002 | Thompson |
| 2002/0035534 A1 | 3/2002 | Buist et al. |
| 2002/0046146 A1 | 4/2002 | Otero et al. |
| 2002/0046149 A1 | 4/2002 | Otero et al. |
| 2002/0046151 A1 | 4/2002 | Otero et al. |
| 2002/0049661 A1 | 4/2002 | Otero et al. |
| 2002/0055901 A1* | 5/2002 | Gianakouros et al. .......... 705/37 |
| 2002/0082967 A1 | 6/2002 | Kaminsky et al. |
| 2002/0128945 A1 | 9/2002 | Moss et al. |
| 2002/0133449 A1 | 9/2002 | Segal et al. |
| 2002/0138390 A1 | 9/2002 | May |
| 2002/0161687 A1 | 10/2002 | Serkin et al. |
| 2003/0004859 A1 | 1/2003 | Shaw et al. |
| 2003/0009411 A1 | 1/2003 | Ram et al. |
| 2003/0018558 A1 | 1/2003 | Heffner et al. |
| 2003/0069826 A1 | 4/2003 | Guidi et al. |
| 2003/0083973 A1 | 5/2003 | Horsfall |
| 2003/0093343 A1 | 5/2003 | Huttenlocher et al. |
| 2003/0167224 A1 | 9/2003 | Periwal |
| 2004/0034591 A1 | 2/2004 | Waelbroeck et al. |
| 2004/0059666 A1 | 3/2004 | Waelbroeck et al. |
| 2004/0177024 A1 | 9/2004 | Bok et al. |
| 2004/0193524 A1 | 9/2004 | Almeida et al. |
| 2004/0210511 A1 | 10/2004 | Waelbroeck et al. |
| 2004/0236669 A1 | 11/2004 | Horst et al. |
| 2005/0004852 A1 | 1/2005 | Whitney |
| 2005/0075963 A1 | 4/2005 | Balabon |
| 2005/0234795 A1 | 10/2005 | Hodes et al. |
| 2006/0020538 A1 | 1/2006 | Ram et al. |
| 2006/0036531 A1* | 2/2006 | Jackson et al. .................. 705/37 |
| 2006/0047590 A1* | 3/2006 | Anderson et al. ............... 705/35 |
| 2006/0080215 A1 | 4/2006 | Warsaw et al. |
| 2006/0080219 A1 | 4/2006 | Lutnick et al. |
| 2006/0206404 A1 | 9/2006 | Hatheway et al. |
| 2006/0259394 A1 | 11/2006 | Cushing et al. |
| 2007/0038549 A1 | 2/2007 | Janowski et al. |
| 2009/0076961 A1 | 3/2009 | Waelbroeck et al. |
| 2010/0030720 A1 | 2/2010 | Stephens |

FOREIGN PATENT DOCUMENTS

| | | |
|---|---|---|
| EP | 1939731 A1 | 7/2008 |
| EP | 2024922 A2 | 2/2009 |
| GB | 2417576 A | 1/2006 |
| KR | 10-2001-0091523 | 10/2001 |
| KR | 2002-0014286 | 2/2002 |
| KR | 2005-0001121 | 1/2005 |
| KR | 10-0591-611 | 6/2006 |
| WO | WO-00/77670 | 12/2000 |
| WO | 0117519 A1 | 3/2001 |
| WO | 01/61579 A1 | 8/2001 |
| WO | 0193169 A1 | 12/2001 |
| WO | 0238945 A1 | 5/2002 |
| WO | WO 02/097589 | 12/2002 |
| WO | 2003048905 A2 | 6/2003 |
| WO | 2005003894 A2 | 1/2005 |
| WO | 2007127041 A2 | 11/2007 |
| WO | 2007127857 A2 | 11/2007 |
| WO | 2008071363 A2 | 6/2008 |
| WO | 2009015387 A2 | 1/2009 |
| WO | 2009015391 A2 | 1/2009 |
| WO | 2009039791 A1 | 4/2009 |
| WO | 2009046258 A2 | 4/2009 |
| WO | 2009059814 A2 | 5/2009 |
| WO | 2009126638 A2 | 10/2009 |
| WO | 2009126683 A2 | 10/2009 |

OTHER PUBLICATIONS

Madden, Bartley J., "Structural Changes in Trading Stocks," The Journal of Portfolio Management, Fall 1993, pp. 19-27.

Domowitz, I., "A Taxonomy of Automated Trade Execution Systems," Journal of International Money and Finance of Butterworth Scientific, Guilford, GB, vol. 12, 1993, pp. 607-632.

Hendershott, T., "Electronic Trading in Financial Markets," IT Pro, Jul./Aug. 2003, pp. 10-14.

Clemons, E.K., et al.: "Restructuring Institutional Block Trading: An Overview of the Optimark System" System Sciences, 1998., Proceedings of the Thirty-First Hawaii International Conference on Kohala Coast, HI, USA Jan. 6-9, 1998, Los Alamitos, CA, USA, IEEE Comput. Soc., US, vol. 6, Jan. 6, 1998 (pp. 301-310) isbn: 0-8186-82555-8.

Weinhardt, C., et al., 'Agent-Mediated Off-Exchange Trading, Systems Sciences, 1999. HICSS-32., Proceeedings of the 32nd Annual Hawaii International Conference on Maui, HI, USA Jan. 5-8, 1999, Los Alamitos, CA, USA, IEEE Comput. Soc., US, Jan. 5, 1999, p. 6pp, ISBN: 0-7695-0001-3.

U.S. Appl. No. 09/504,939, Christopher R. Stephens.

A Paper presented in Maastricht NL Aug. 2004: Harald A. Benik et al. "A Study of Neo-Austrian Economics using an Artificial Stock Market" pp. 1-41.

Artificial Life, vol. 4, No. 2, pp. 183-201: Christopher R. Stephens et al. "Self-Adaptation in Evolving Systems" (Spring 1998).

Jose L. Gordillo et al. "Analysis of Financial markets with the Artificial Agent-based Model—NNCP*" pp. 1-10 (ENC01 (INEGI), pp. 251-263 (2001).

Christopher R. Stephens et al. "Testing Efficiency in a Simulated Market using Excess Returns" pp. 1-17 (publication date unknown).

Handbook of Marketing Research—Uses, Misuses, and Future Advances, eds Grover & Vriens (Sage Publications) Christopher R. Stephens et al. "An Introduction to Data Mining" pp. 1-39 (published Jun. 23, 2006).

Genetic Programming and Evolvable Machines, vol. 1, pp. 363-378, Christopher R. Stephens et al. "Effective Fitness as an Alternative Paradigm for Evolutionary Computation I: General Formalism" (Oct. 2001).

Genetic Programming and Evolvable Machines, vol. 2, pp. 7-32, Christopher R. Stephens et al. "Effective Fitness as an Alternative Paradigm for Evolutionary Computation II: Examples and Applications" (Mar. 2001).

* cited by examiner

BLOCK TRADING SYSTEM AND METHOD PROVIDING PRICE IMPROVEMENT TO AGGRESSIVE ORDERS

REFERENCE TO RELATED APPLICATIONS

The present application claims the benefit of U.S. Provisional Application Nos. 60/962,307, filed Jul. 26, 2007; 60/981,242, filed Oct. 19, 2007; 61/032,623, filed Feb. 29, 2008; and 61/043,172, filed Apr. 8, 2008. Related subject matter is disclosed in U.S. patent application Ser. Nos. 10/310,345, filed Dec. 5, 2002, 10/603,100 filed Jun. 24, 2003 and 10/799,205, filed Mar. 11, 2004, and 11/783,250 through 11/783,254, all filed Apr. 6, 2007; all currently pending. The disclosures of all of the above-referenced applications are hereby incorporated by reference in their entireties into the present disclosure.

FIELD OF THE INVENTION

The present invention is directed to order management in financial trading and more specifically to such order management that provides protection from poor executions caused by adverse movements in the market and/or other traders seeking to "game" the system.

DESCRIPTION OF RELATED ART

In public securities markets, market mechanics and trading psychology create barriers to efficient information dissemination and price discovery. A market participant's decision to reveal information about his or her true price limits represents a tradeoff between the market impact cost of affecting price expectations and the opportunity cost of delaying or failing to execute a trade. As used herein, the term "market participant" refers to any person or firm with the ability to trade securities or other financial products; examples of market participants include broker-dealers, institutions, hedge funds, statistical arbitrage and other proprietary trading operations, and private investors trading on electronic communication networks (ECNs).

By displaying a buyer's true price limit to one or more prospective sellers, for example, a market participant is in effect writing an option that either of the sellers may freely elect to execute; as long as this option is open it sets a lower bound on the market participants' expectations of what the fair trade price should be. Even if one of the sellers originally had a lower price expectation, this expectation is immediately changed when the buyer's price limit is known, the only remaining question being whether the fair price should be even higher. Indeed, by disclosing a high price the buyer indicates an eagerness to acquire the stock, which may reflect information that has yet to come to the seller's attention.

Broker-dealers cope with this problem by carefully managing expectations of parties on both sides of a trade until a fair price has been discovered, and then proposing a fair trade price that can be satisfactory to both. Today such agency orders are increasingly delivered electronically. Orders identified as "not held" are not displayed on the public market, to avoid the above-mentioned impact on price expectations. Brokers may receive crossing not held orders on the buy and sell sides, and find themselves in the position of having to choose a fair price to execute the crossed trade, somewhere between the limits of the two orders. Discretion is normally used when handling such a situation. For example, if a buyer has placed a large block buy order at $30.00 at 10:00 AM, and the market has since fallen to a current best offer of $29.80, a large block sell order at $29.99 would most likely not be automatically crossed at this price, since it now seems expensive compared to the current market; the buyer's limit is interpreted as an instruction to stop buying if the market price were to rise above this level. But a block sell order at $29.82, which also crosses the buyer's much higher limit, would probably be accepted, while one at $29.85 might prompt the broker to call the buyer.

This human intermediation comes at a steep price, both in terms of commissions paid and in terms of information leakage to individuals who have close relationships with aggressive trading firms such as hedge funds. This has fueled a desire from large institutions to find an alternate marketplace where they can post their orders themselves, without discretionary intervention by a traditional broker.

Electronic markets such as NASDAQ or Electronic Communication Networks (ECNs) are not well equipped to handle the price discovery problem for large block trades. In its simplest form, an electronic marketplace simply displays the trading interests of the buyers and sellers to their subscribers, which then have the ability to execute such buy and sell interests. To avoid impacting the market participants' price expectations, users of electronic markets typically place relatively small orders at passive prices, and patiently wait for others to execute them, or take a somewhat more aggressive stance and execute the orders that others have posted on the other side of the spread.

Tools are available to "slice and dice" larger orders into a large number of small pieces that can be worked in this manner, but their activity inevitably reveals the existence of the larger order to those who are skilled in the art of statistical analysis. Such traders develop and optimize trading strategies that deliberately detect large confidential orders as they are being worked, and generate profits by anticipating the market impact that those orders are likely to cause. The simplest such strategy is that of taking a position ahead of the larger order and relying on its continued presence to push the price in a profitable direction. By trading in the same direction as the large order, such parasitic strategies end up exacerbating the price movements that would naturally have been caused by the large order in the first place. The end result is not altogether different from that of posting a large order on the New York Stock Exchange: in the latter case, floor traders join in to "participate" with an auctioned order, or directly step in front to intercept the liquidity that it was able to attract. The terms "penny-jumping" and "front-running" have come to be applied to describe this type of parasitic strategy on the NYSE floor and on electronic marketplaces alike.

Some ECNs offer more sophisticated order types in an attempt to alleviate the front-running problem. Some of these (e.g., discretion orders), simply try to mask the true price limit by showing one price but grabbing priority to execute up to a higher confidential price limit. These suffer from simple counter-strategies, such as that of spraying small orders at different price levels to see when an order gets executed at an undisplayed price level. Other sophisticated order types use minimum quantity conditions in conjunction with hidden discretionary prices to avoid detection by sprays of tiny orders. Since no price is displayed there is no "price revelation" in the traditional sense. Yet, a block trader with a contra interest can discover the first order's limit, and would indeed have a fiduciary obligation to do so, simply by repeatedly placing and canceling orders at steadily worse price levels until the order intersects with the resident order's limit. Thus, although price expectations are not altered prior to the trade, a trader who places a large hidden order on an ECN to buy at $30.00 should indeed expect to trade at $30.00, even if the seller would otherwise have been willing to accept any price down to $29.90.

As a result, electronic books such as SuperMontage have difficulty attracting significant size orders at attractive price levels, as most participants quickly learn that it is more profitable to lurk in the shadows and take what prices others are willing to show, or display small sizes at a time. This has led to an evolution of the marketplace wherein the average trade size has fallen steadily to about 500 shares while the total traded volume and average institutional order sizes have been increasing.

In this environment, there is an acute need for an electronic trading system that rewards traders who are willing to confidentially express their true price aggression with the benefit of price improvement when the contra party is similarly aggressive. In such a block trading solution, the optimal strategy for aggressive traders should be to place their orders with an aggressive price, while passive traders would naturally be best served by placing passively priced orders.

Yet answering such a need cannot come at the expense of the main perceived advantage of electronic trading systems over traditional marketplaces, which is the ability to instantly execute trades with no human intermediation or pre-trade information leakage.

The challenge, in short, is to protect an order that is electronically executable at an aggressive limit price from actually being executed at such an aggressive price when the contra was in fact willing to be aggressive as well.

To tip the scale back in favor of the party who has placed an aggressive order, without losing the perceived advantage of electronic-speed executions and without the mediation of a third party, one must identify value items that can strengthen the negotiating position of a party who is willing to express an aggressive price. One such value item is information. Related application Ser. No. 10/603,100, filed Jun. 24, 2003; Ser. No. 09/870,845, filed May 31, 2001; Ser. No. 09/750,768, filed Dec. 29, 2000 and Ser. No. 09/585,049, filed Jun. 1, 2000 (the entire contents of each are incorporated herein by reference) show how parties willing to confidentially disclose Certified Trading Interest information to a computer system can gain the right to receive Certified Trading Interest information from other parties who are interested in trading with them. This opens the possibility of reversing the arrow of information flow when a trader places an aggressively-priced order in a trading system: the aggressive price is not shown to third parties, but instead helps the trader attract information from third parties with more passive offers.

However regardless of the degree of information shared by the users of the inventions referenced above; all users of the subject systems seek as many types of protection as possible from poor executions caused by adverse movements in the market and/or other traders attempting to "game" the system.

SUMMARY OF THE INVENTION

It is therefore an object of the invention to provide anti-gaming and price protection measures to help prevent automatic executions at undesirable prices and otherwise to enhance the trading experience.

To achieve the above and other objects, the present invention comprises various anti-gaming features designed to enhance the inventions incorporated by reference herein. One such anti-gaming feature is a randomly timed match check event that delays the automatic execution between firm orders in the subject system by some random length of time address the issue of predatory users using bogus or very small orders to manipulate the market in a stock in order to "micro-time" an order on the subject system. In particular, the time at which two firm orders are automatically matched and executed via a match check event is randomly selected from a minimum/maximum range, such that once an order is entered, the user cannot know precisely when a match check event (and therefore an execution will occur); thereby making it harder to control the market for a quick push up (or down) before trying to execute a sell (or buy) order on the subject system. As an extension of this feature, random delays in liquidity notifications can also be used. Said liquidity notifications can include, but are not limited to: active symbol notifications which are indications of firm order activity as described in application Ser. No. 10/603,100 filed Jun. 24, 2003, contra present notifications which are indication that alert a trader to the presence of a contra order to one of his active orders in the subject system that is priced below a reference price as described in application Ser. No. 10/799,205, filed Mar. 11, 2004, or contra target notifications which are indication that alert a trader to the presence of a contra order to one of the orders in his OMS that is not yet active in the subject system as described in the above-cited provisional applications and in co-pending U.S. patent application Ser. No. 12/181,028.

In addition to preventing predatory users from "micro-timing" executions as explained, this random match check event feature also prevents predatory users from being able to confidently "test" the side of an order in the subject system. This phenomenon of trying to use orders to "test" the side of resident orders in the subject system is unique to the subject system because of the subject system's use of "active symbol notifications" to generate liquidity in a symbol as described in application Ser. Nos. 10/603,100 filed Jun. 24, 2003 and 10/799,205, filed Mar. 11, 2004. As described in these applications, the subject system uses sideless, sizeless and priceless notifications in specific symbols to alert users to the presence of firm order activity in those symbols. A perceived weakness of these active symbol notifications has been the assumption that if a user quickly enters and then cancels an order in a security where an active symbol notification is present without receiving a fill; that the user can assume the order was entered on the same side as the resident order. However, the addition of random match check events dispels this assumption since the predatory user cannot know if he did not receive a fill because his order was on the same side as the resident order, or because he did not leave the order in the system long enough to trigger the random match check event.

Another aspect of the invention designed to protect users from automatic executions at undesirable prices is a feature that prevents auto-execution when there are drastic swings in the market and/or alerts a user when he has an order exposed to automatic execution during a drastic swing in the market. This feature can be called Xtreme Volatility Protection (XVP) and embodiments of this feature include XVP Protect and XVP Alert.

Yet another aspect of the invention designed to protect users from poor execution is a feature for limiting or filtering which members of the subject system's trading community receive an active symbol notification when a user enters a firm, auto-executable order. This feature is called "Channel Select" and is available to traders submitting orders. As previously noted, one of the unique aspects of the subject system as described in application Ser. Nos. 10/603,100 filed Jun. 24, 2003 and 10/799,205, filed Mar. 11, 2004 is the subject system's methodology for attracting liquidity to system by using sideless, sizeless and priceless "active symbol notifications" that alert users to the presence of firm order activity in system in specific symbols. While these sideless active symbol notifications are a unique and powerful liquidity generating tool offered by the subject system; some users also perceive them as a potential source of information leakage when viewed by predatory traders. To address this concern, the "Channel Select" feature allows a trader to limit which members of the subject system's trading community see the active symbol notification when he enters a firm, auto executable order. In a preferred embodiment, a drop-down menu presented at the point of order entry allows a trader to select which component of the subject system's trading community will receive the sideless active symbol notification when that trader submits the order to the subject system. Examples of the trader's Channel Select options include but are not limited to, "Entire community" or "Buy-side only" or "institutions managing over 5 billion in assets," or any other type of relevant filtering criteria as could be imagined by one skilled in the art. "Buy-side only" means that the active symbol notification will only be displayed to traders at firms configured as "Institution" or "Hedge Fund" in the subject system's database. It is important to note, however, that while the Channel Select option does limit which traders see the active symbol notifications; the active symbol notifications seen by the selected subset of users still follow all normal rules for when the notifications are turned "ON" or "OFF."

Finally, the various embodiments of the invention are also all usable with Stealth Mode, a feature which offers users yet another layer of protection from predatory users. As previously noted, some traders view the subject system's active symbol notification as a potential source of information leakage when viewed by predatory traders. While some traders consider the Channel Select option a sufficient level of protection against this perceived source of information leakage; other traders want the ability to prevent entirely or drastically limit the generation of active symbol notifications when they enter a firm, auto executable order. To address this need, the stealth mode goes beyond the community-level filtering offered by Channel Select and gives users the ability to submit firm auto-executable orders that either do not trigger the active symbol notification at all or only trigger the active symbol notification on a limited basis.

The preferred embodiment of this stealth mode gives traders a 'Stealth' order entry option at the point of order submission that can follow "Dark" or "Black" order indicating rules, as described herein. Stealth, Black and Dark are all terms that correspond to a specific user interface and should not be construed as limiting. The rules associated with the Stealth option may be configured on the subject system's centralized trading server, (referred to as the PTS from this point forward), at the firm/user level.

In the preferred embodiment the default rule for the Stealth order will be Dark, but other embodiments can have the default as Black. In a preferred embodiment the Dark and/or Black Stealth order option is only provided to a subset of buy side customers; however in other embodiments, Stealth orders will be provided for all customers including all buy side and sell side users.

When a user enters a firm, auto-execute order in the system as "Dark," rather than triggering the active symbol notification as in the "typical" order handling rules, the corresponding symbol will not display the active symbol notification. Furthermore, once the order is active in the subject system, that order will only trigger the active symbol notification on a minimal basis; and when it does trigger the notification, it will have a very brief duration and there will be significant delays between notification events when they do happen. More specifically, when Dark orders generate the active symbol notification, the notification will flash for a limited period of time (mimicking IOC ("immediate or cancel") orders), with a delay between flashing events from 1 to 40 minutes. In addition, Dark orders do not have standing, meaning they are not given Price-time priority in the subject system's order queue. More specifically, if a Dark order is resident in the system at the same time as an order in the same symbol on the same side with the same price that is not classified as Dark (or Black), and a contra to the orders arrives in the system; the non Dark order will receive the execution even if it was entered after the Dark order.

Dark orders will trigger contra present indications, one of the subject system's types of liquidity notification that alerts users to the presence of a "passive" (an order priced below a reference price) contra orders in the subject system. As stated in the introduction, the purpose of the contra present indication is to reward users willing to enter "aggressive" orders (orders priced at or above a reference price) by giving them the option to trade at a price below the mid-point of a reference price when their aggressive orders are matched with passive orders. More specifically if a Dark order is a passive order and an aggressive contra order is entered into the system; the user entering the aggressive contra order to that passive Dark will receive a contra present notification alerting the user to presence of that passive Dark order. Furthermore, if a Dark order has an aggressive price and a user enters a passive contra order to that aggressive Dark order the trader who entered the aggressive Dark order will receive the contra present notification alerting that user to presence of the passive contra order.

When a user enters a firm, auto-execute order in the system as "Black," that order will never generate an active symbol notification. In addition, a passive Black Order will not trigger a contra present indication if an aggressive contra order is entered into the system; nor will an aggressive Black Order earn a user the right to see a contra present indication in the event another user enters a passive contra to that aggressive Black order. Like Dark orders, Black orders do not have standing, meaning they are not given Price-time priority in the order queue. More specifically, if a Black order is resident in the system at the same time as an order in the same symbol on the same side with the same price that is not classified as Black (or Dark), and a contra to the orders arrives in the system; the non-Black order will receive the execution even if it was entered after the Black order. The Black order option may be limited to certain authorized users who have permission to access the feature. This permission can be granted based on any number of criteria as will be understood by those skilled in the art, including but not limited to user or firm level trade history or firm classification, e.g., buy side or sell side customer, assets under management.

BRIEF DESCRIPTION OF THE DRAWINGS

Preferred embodiments of the invention will be set forth in detail with reference to the drawings, in which.

DETAILED DESCRIPTION OF THE PREFERRED EMBODIMENTS

Preferred embodiments of the invention will be set forth in detail with reference to the drawings, in which like reference numerals refer to like elements or steps throughout.

Figure 1:
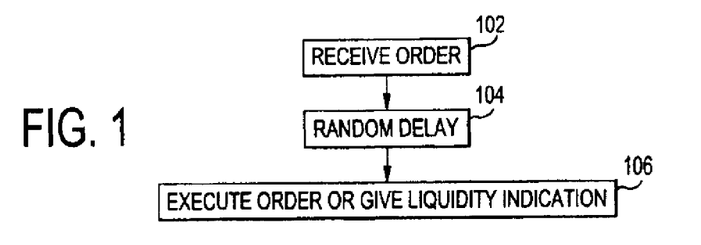
FIG. 1 is a flow chart of the preferred embodiment for introducing a random delay.

Embodiments of the randomly timed match check event feature may be provided as follows. Customers/users may have orders (entered in FIG. 1, step 102) subjected to a random delay time (FIG. 1, step 104) before execution (FIG. 1, step 106). This delay may be assigned on a per-order basis and can be chosen randomly from within a minimum/maximum range that is typically determined on a firm by firm basis. The min/max ranges may vary from firm to firm based on past trade history and firm information/characteristics; for example, they can range from 0/0 for the users with the "lowest risk" profiles and up to 60/500 (or any other range) for trades with the most "risky" profiles. The ranges may also be based on other characteristics of a firm.

In some embodiments, this feature may only apply when users are responding to a an active symbol notification (an indication of firm order activity as described in application Ser. No. 10/603,100 filed Jun. 24, 2003), a contra present notification (an indication that alerts a trader to the presence of a contra order to one of his active orders in the subject system that is priced below a reference price as described in application Ser. No. 10/799,205, filed Mar. 11, 2004), a contra target notification (an indication that alerts a trader to the presence of a contra order to one of the orders in his OMS that is not yet active in the subject system as described in the above-cited provisional applications and in co-pending U.S. patent application Ser. No. 12/181,028 or any other indicator used by the subject system. In this embodiment, a user would be the responding trader or the "second one in" for this feature to apply. In other embodiments this feature would apply to certain users at all times, regardless of whether the user was the initiating or responding trader.

While this random match check feature may delay a match check event, it does not affect price-time priority. More specifically, if a user with a "high risk" profile responds to an order, and the random delay has prevented a match check event from occurring, and within the span of that delay another user with a very "low risk" profile enters another contra order which has a random delay that is shorter than the delay assigned to the higher risk user's order, then the high risk user will still get the first fill(s).

Another anti-gaming feature provided by the system is randomly timed active symbol notification events associated with user classifications. In an embodiment of this feature, the subject system associates random delays with active symbol notifications based on the user entering the order. For example, individual users, individual orders, entire firms, particular order types or other elements may be classified or categorized according to certain criteria, e.g., various levels of "risk" associated with said element. Then based on the order/user/firm classification, liquidity notification event (for example but not limited to the active symbol notification, the contra present notification or contra target notification), could be delayed for longer/shorter periods of time, or perhaps may not occur.

Figure 2:
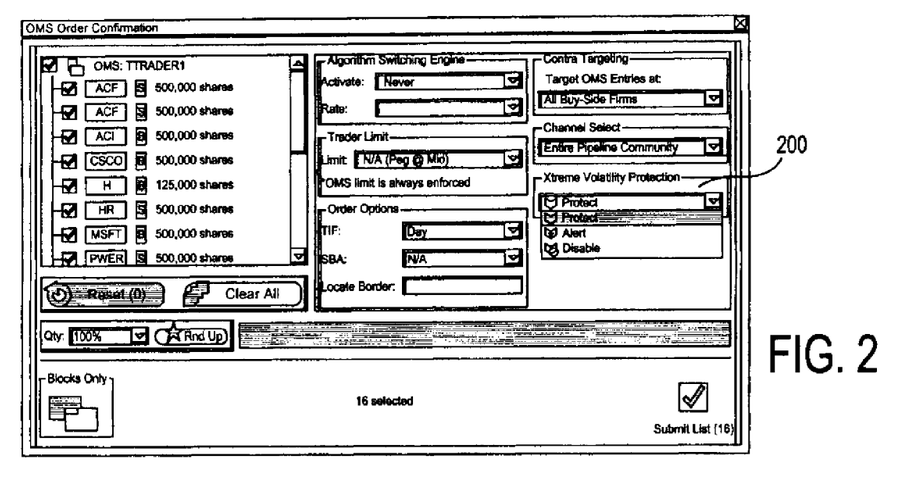
FIG. 2 represents an example of an order entry screen for a preferred embodiment of the present invention for providing extreme volatility protection.

Other preferred embodiments of the techniques for protection from executions at undesirable prices can be implemented as follows. FIG. 2 represents an example of an order entry screen for a preferred embodiment of the subject system wherein a user is able, as in element 200, to enable XVP Protect, XVP Alert or XVP Disable.

XVP Protect provides for logic which operates on both the PTS and on the user's subject system desktop application, from here forward referred to as the client GUI. On the server side, the server may constantly compare a limit a trader has placed on an order (FIG. 3, step 302) with the price range for that symbol established by the Bollinger Bands (or other standard or indicator of volatility) (FIG. 3, step 304).

Figure 3:
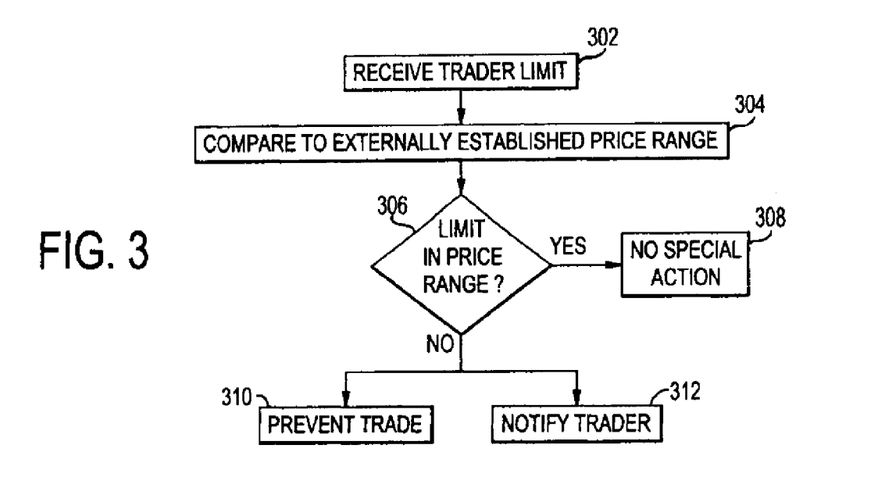
FIG. 3 is a flow chart of the preferred embodiment for extreme volatility protection.

If a trader has enabled XVP Protect and it is determined in FIG. 3, step 306, that the trader's limit price moves outside the Bollinger range (or other range), then the PTS will prevent an automatic execution (FIG. 3, step 310) until the limit price falls back inside the (Bollinger) range (FIG. 3, step 308).

At the same time, a trader's client GUI is making comparisons between the trader's limit price and the (Bollinger) range. When the limit price is outside of the range (which means the PTS will not execute the order), the client GUI notifies the trader than executions are being prevented via a visual indication or some other indicator (FIG. 3, step 312). The purpose of this indication is to let the user know that his order(s) in that symbol will not execute at the current price and that if he wants an execution despite the price he may need to adjust his limit price.

When an XVP Alert feature is enabled, only the logic on the trader's client GUI is in operation. In an "Alert" state, the trader will be notified that the limit on his order(s) in a particular symbol are outside of the Bollinger Band range but unlike XVP Protect; in XVP Alert mode the order is still available for automatic execution. As with XVP Protect, the client GUI use some kind of indication to notify the trader that the limit on his order is outside of the Bollinger Band range.

In the XVP Disable state, neither the subject system trading server or the subject system desktop application monitor the trader's limit prices relative to the Bollinger Band range. In the Disable mode, all trades may execute regardless of the stock's price and the trader may not receive any kind of notification.

Figure 4:
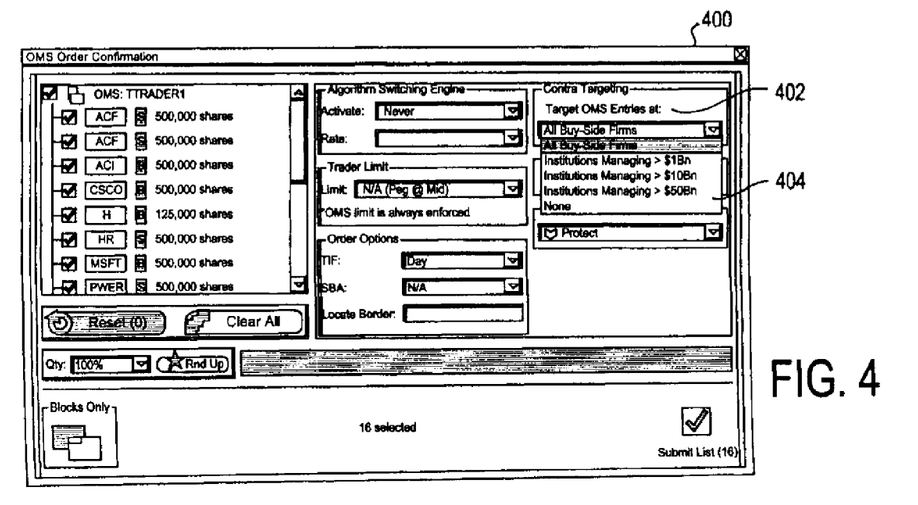
FIG. 4 shows an example of a drop-down menu for Channel Select.

Still another preferred embodiment is called Channel Select and can be implemented as shown in FIG. 4. In a GUI shown to a trader, an order confirmation screen 400 includes a "Target OMS Entries at:" entry 402 with a drop-down menu 404. Clicking on the drop-down menu brings up a list of components of the trading community who will be able to see the order. By selecting the appropriate entry, the trader can control which elements of the subject system's trading community see the sideless active symbol notification triggered by the user's order.

Figure 5A:
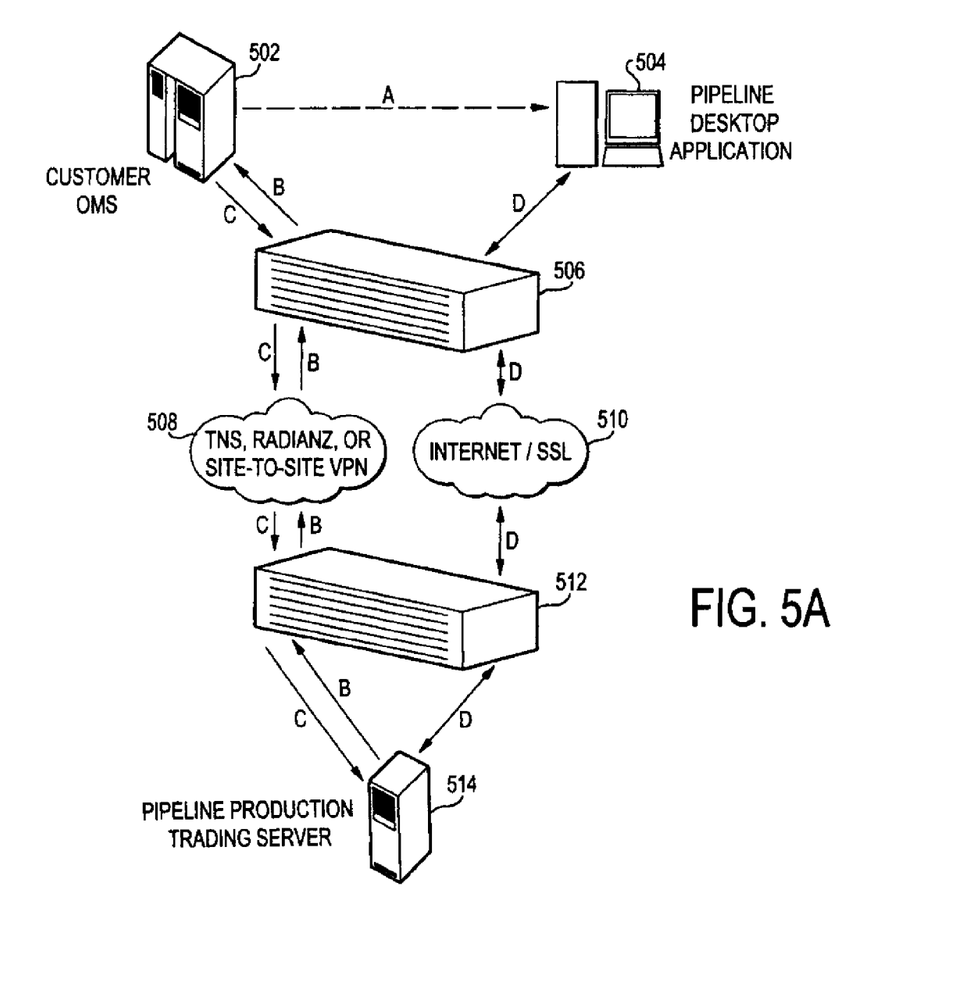
FIGS. 5A-5C are schematic diagrams of a system and variations on which the preferred or other embodiments of the invention can be implemented
Figure 5B:
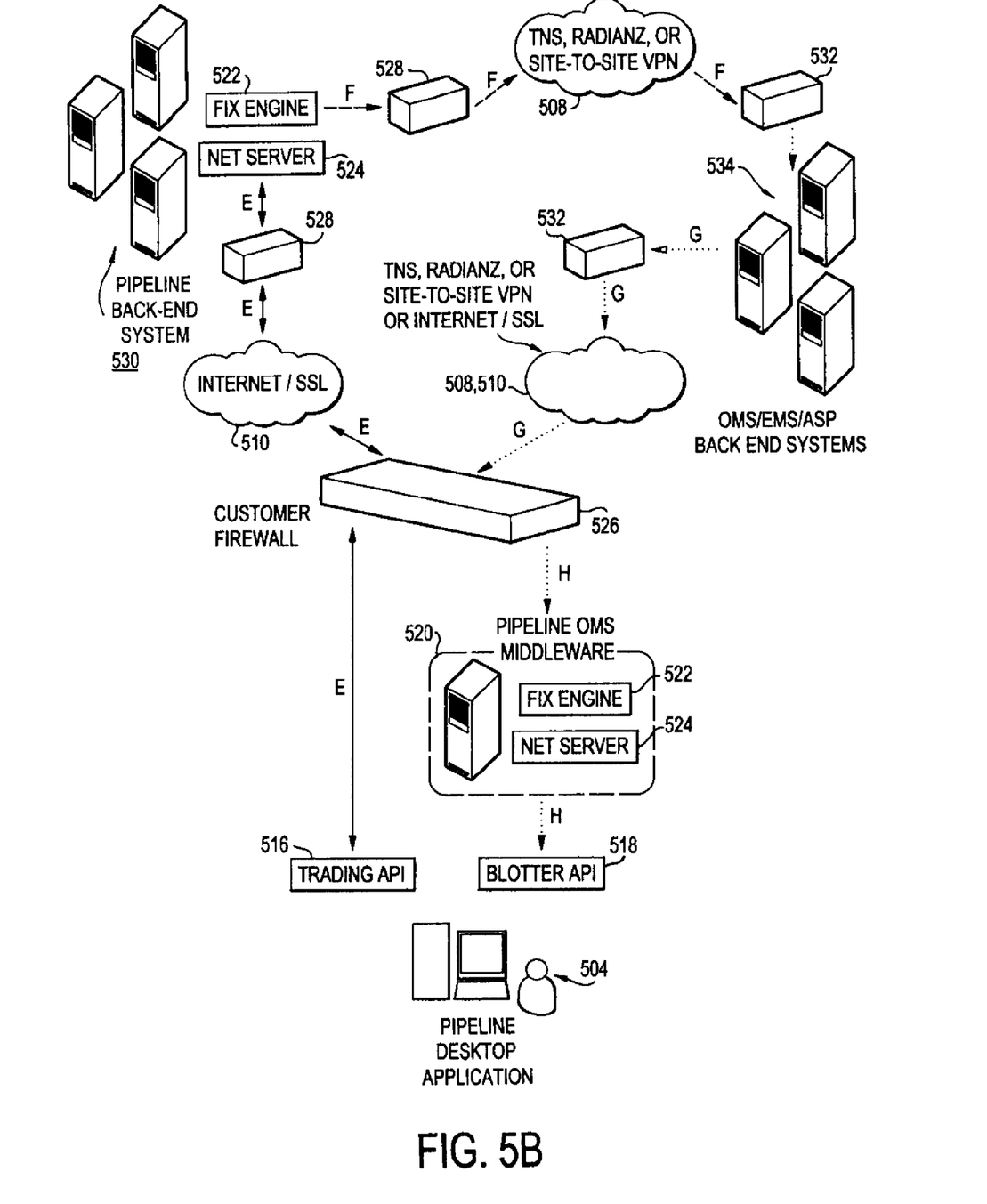
Figure 5C:
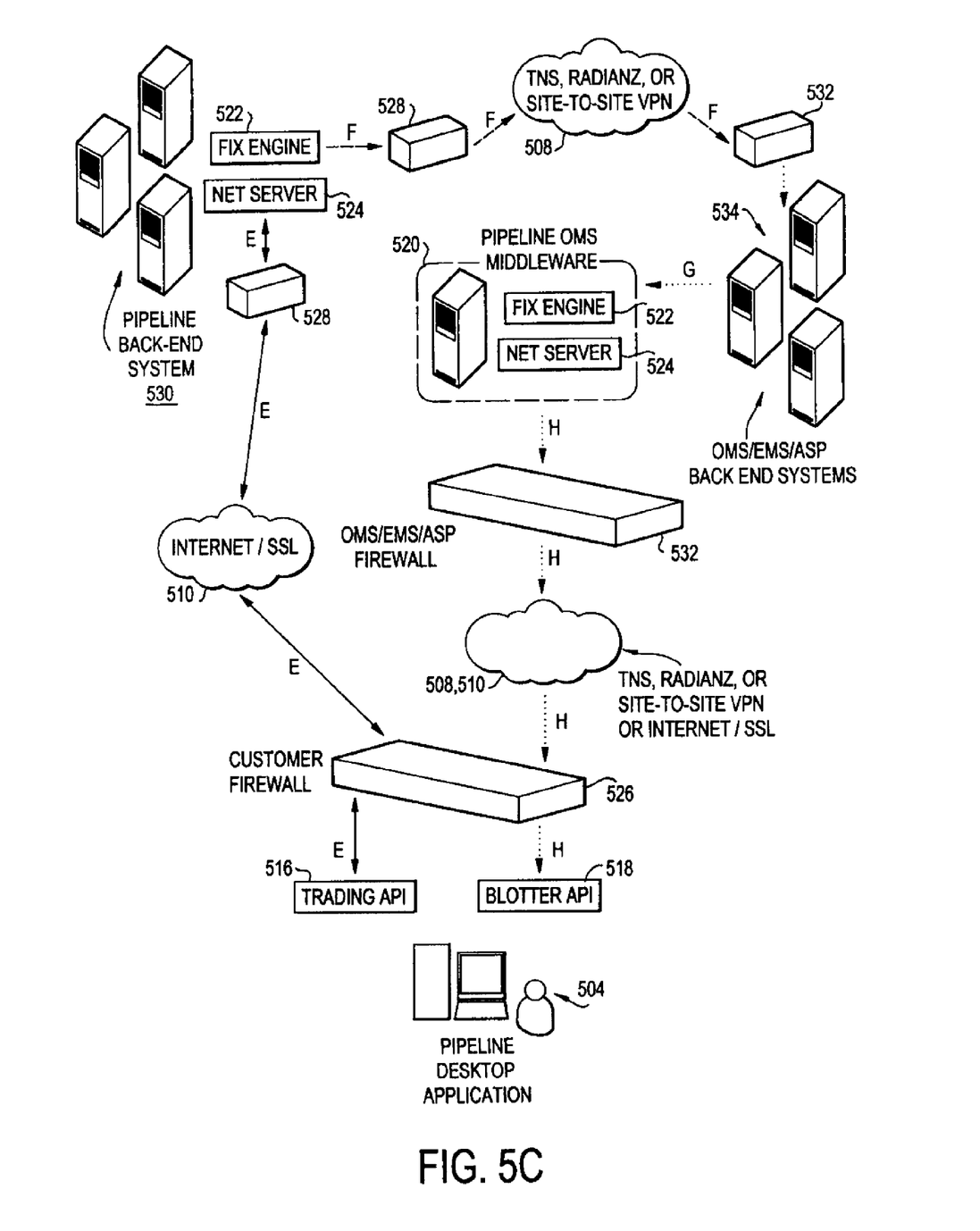

FIGS. 5A-5C are schematic diagrams showing hardware on which the above or other embodiments can be implemented. FIG. 5A shows an implementation in which there is no middleware. A customer OMS 502 and a workstation running a client GUI (desktop application) 504 are behind a firewall 506. The OMS 502 and the client GUI 504 communicate through a virtual private network 508 and the Internet 510, respectively, and another firewall 512 to a trading server (PTS) 514. Arrows A indicate sweep events; arrows B, placements and executions; arrows C, FIX (Financial Information Exchange) acknowledgments and non-acknowledgements; and arrows D, the client API.

FIG. 5B shows the use of middleware at the customer site. The GUI 504 includes a trading API 516 and an OMS API 518. The middleware 520 includes a FIX engine 522 and a net server 524. The GUI 502 and the middleware 520 reside behind a customer firewall 526. The trading API 516 in the GUI 504 communicates, as indicated by arrows E, through the customer firewall 526, the Internet 510, and a back-end firewall 528 with the back-end systems 530, which also have a FIX engine 522 and a net server 524. In a trading session, the back-end systems 530 communicate, as indicated by arrows F, through the firewall 528, a VPN 508 and another firewall 532 to OMS back-end systems 534. In an OMS publish session, the OMS back-end systems communicate, as indicated by arrows G, through the firewall 532, a VPN 508 or the Internet 510, and the customer firewall 526 with the middleware 520. In an OMS API data flow, the middleware 520 communicates with the OMS API 518 in the GUI 504, as indicated by arrow H.

FIG. 5C shows the middleware 520 at the OMS back-end systems 534. The data flow of FIG. 5C differs from that of FIG. 5B in that OMS publish session goes only as far as the middleware 520, which is behind the OMS back-end firewall 532, and in that the OMS subscribe API data flow goes thence through the firewall 532, a VPN 508 or the Internet 510, and the customer firewall 526 to the OMS API 518 in the GUI 504.

The auto-execution price protection offered by all of the features described in this application are not limited to block trading or the trading systems described in application Ser. Nos. 10/310,345, filed Dec. 5, 2002, 10/603,100 filed Jun. 24, 2003 and 10/799,205, filed Mar. 11, 2004. All of the features described herein are also usable with the algorithm switching engine disclosed in U.S. patent application Ser. Nos. 11/783,250 through 11/783,254, all filed Apr. 6, 2007; and 12/153,362, filed May 16, 2008, whose disclosures are hereby incorporated by reference into the present disclosure, or with any other suitable trading system.

While preferred embodiments have been set forth above, those skilled in the art who have reviewed the present disclosure will readily appreciate that other embodiments can be realized within the scope of the invention. For example, numerical values are illustrative rather than limiting. Also, embodiments disclosed separately can be combined in any suitable manner. Moreover, the invention has applicability beyond the trading of securities, including the trading of financial products (stocks, bonds, options, futures, currencies, etc.) and non-financial items. Furthermore, while it is contemplated that the invention can be used with Order Management Systems as now understood, the invention can also be used with any other information management system that tracks and/or manages trading interest and/or order information as would be known to those skilled in the art, for example but not limited to EMS's (electronic management systems) and other such systems that exist now or may be developed later. Accordingly, the term "order management system" should be construed as encompassing all such systems unless otherwise limited. Therefore, the present invention should be construed as limited only by the appended claims.

We claim:

1. A method for trading items among a plurality of traders who have been assigned risk profiles based at least in part on past trading behavior, the method comprising:
   (a) receiving two or more matching orders from the traders into an electronic trading system;
   (b) delaying for a random period of time execution of said matching orders by a value in a range selected by a first processor in accordance with the risk profile of a trader who placed one of said matching orders; and
   (c) executing with a second processor the matching orders in the electronic trading system immediately upon expiration of said random period of time,
   wherein said first and second processors may be the same processor or different processors.

2. The method of claim 1, wherein step (b) is performed only for orders placed in response to a system indicator.

3. The method of claim 1, wherein step (b) does not affect a price-time priority of said at least some of the orders.

4. A system for trading items among a plurality of traders who have been assigned risk profiles based at least in part on past trading behavior, the system comprising:
   a communication component for receiving two or more matching orders from the traders into an electronic trading system; and
   a trading server for delaying for a random period of time execution of said matching orders by a value in a range selected in accordance with the risk profile of a trader who placed one of said matching orders and executing the matching orders in the electronic trading system immediately upon expiration of said random period of time.

5. The system of claim 4, wherein the trading server randomly delays only for orders placed in response to a system indicator.

6. The system of claim 4, wherein said random delaying does not affect a price-time priority of said at least some of the orders.

7. An article of manufacture for trading items among a plurality of traders who have been assigned risk profiles based at least in part on past trading behavior, the article of manufacture comprising:
   a computer-readable storage medium; and
   code on the computer-readable storage medium, the code, when executed on one or more computing devices, controlling said one or more computing devices for:
   (a) receiving two or more matching orders from the traders into an electronic trading system;
   (b) delaying for a random period of time execution of said matching orders by a value in a range selected in accordance with the risk profile of a trader who placed one of said matching orders; and
   (c) executing the matching orders in the electronic trading system immediately upon expiration of said random period of time.

8. A method for trading items among a plurality of traders who have been assigned risk profiles based at least in part on past trading behavior, the method comprising:
   (a) receiving two or more matching orders from the traders into an electronic trading system;
   (b) delaying for a random period of time a liquidity notification event regarding at least one of said matching orders by a value in a range selected by a processor in accordance with the risk profile of a trader who placed one of said matching orders; and
   (c) transmitting a notification associated with said liquidity notification event immediately upon expiration of said random period of time.

9. The method of claim 8, wherein the liquidity notification event comprises an active symbol notification, a contra present notification, or a contra target notification.

10. A computer system for trading items among a plurality of traders who have been assigned risk profiles based at least in part on past trading behavior, the system comprising:
    (a) a receiving processor for receiving two or more matching orders from the traders into an electronic trading system;
    (b) a delaying processor for delaying for a random period of time a liquidity notification event regarding at least one of said matching orders by a value in a range selected in accordance with the risk profile of a trader who placed one of said matching orders; and (c) a transmitting processor for transmitting a notification associated with said liquidity notification event immediately upon expiration of said random period of time;

wherein said receiving processor, delaying processor, and transmitting processor may the same processor, separate processors, or a combination thereof.

11. The system of claim 10, wherein the liquidity notification event comprises an active symbol notification, a contra present notification, or a contra target notification.

12. A computer readable non-transitory storage medium storing computer readable computer code operable to instruct a computer system to enable trading of items among a plurality of traders who have been assigned risk profiles based at least in part on past trading behavior, the code comprising:

(a) code for receiving two or more matching orders from the traders into an electronic trading system;

(b) code for delaying for a random period of time a liquidity notification event regarding at least one of said matching orders by a value in a range selected in accordance with the risk profile of a trader who placed one of said matching orders; and (c) code for transmitting a notification associated with said liquidity notification event immediately upon expiration of said random period of time.

13. The medium of claim 12, wherein the liquidity notification event comprises an active symbol notification, a contra present notification, or a contra target notification.

* * * * *